(12) United States Patent
Steinbrecher (10) Patent No.: US 6,850,173 B1
(45) Date of Patent: Feb. 1, 2005

(54) WATERWAY SHIELDING SYSTEM AND METHOD

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 100 days.

(21) Appl. No.: 10/429,331

(22) Filed: Apr. 30, 2003

(51) Int. Cl.[7] .............................................. G08B 23/00
(52) U.S. Cl. ..................................... 340/984; 367/131
(58) Field of Search ..................... 340/984; 367/907, 367/131, 141

(56) References Cited

U.S. PATENT DOCUMENTS

| | | | | |
|---|---|---|---|---|
| 3,890,616 A | * | 6/1975 | Kojima et al. ................. | 342/41 |
| 3,971,018 A | * | 7/1976 | Isbister et al. ................. | 342/41 |
| 5,303,207 A | * | 4/1994 | Brady et al. .................. | 367/134 |
| 5,432,515 A | * | 7/1995 | O'Conner et al. ............ | 342/23 |
| 5,535,176 A | * | 7/1996 | Yang ............................ | 367/13 |
| 6,249,241 B1 | * | 6/2001 | Jordan et al. ................. | 342/41 |
| 6,707,414 B2 | * | 3/2004 | Van Rees et al. ............. | 342/23 |

* cited by examiner

Primary Examiner—Toan N. Pham
(74) Attorney, Agent, or Firm—James M. Kasischke; Michael F. Oglo; Jean-Paul A. Nasser (57) ABSTRACT

A waterway shield system comprises a plurality of autonomous underwater nodes wherein each underwater node comprises acoustic detectors which may comprise horizontal and/or vertical acoustic arrays which may be directly mounted thereto or extend outwardly therefrom. Each underwater node comprises an acoustic modem for transmitting high resolution acoustic data to a gateway node that provides a connection to a surface system and a network of other underwater nodes in other waterways. The data from the underwater nodes may be utilized to produce acoustic attribute data for hulls of ships in the waterways. An acoustic database is provided that compiles the predetermined acoustic attribute data for a variety of ships and other entities thereby providing previously stored identifying means. The acoustic database is utilized in conjunction with one or more databases of other physical attributes of ships or other objects to thereby provide an automated identification process.

20 Claims, 5 Drawing Sheets

WATERWAY SHIELDING SYSTEM AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a system for monitoring waterways and, more specifically, to a system comprising a plurality of underwater communication networks and sensors linked to a common database for monitoring surface and subsurface water traffic through harbors, shore areas, straights, and the like.

(2) Description of the Prior Art

The Meridian World database contains listings of 9,597 worldwide harbors and ports. About 6-billion tons of sea-borne cargo is delivered annually to nearly 10,000 ports and harbors throughout the world. More than three-fifths of the world's oil trade moves by sea. In the United States alone, approximately 50,000 ships, each having a capacity in excess of 300 tons, call on roughly 360 United States ports every year. With more than 95,000 miles of open shoreline and 25,000 miles of navigable waterways, the United States is faced with a formidable undertaking in order to secure its water assets. For instance, there presently exists no practical system capable of monitoring the subsurface of thousands of transport hulls as the transports enter ports and waterways to determine if it might have been altered in between ports to carry explosives or weapons of mass destruction.

Any threat to sea-borne trade must be considered a serious attempt to adversely affect the world economy. In early October 2002, A French VLCC (Very Large Crude Carrier) chartered by Malaysian state oil company Petronas was attacked by terrorist suicide bombers off the coast of Yemen. The VLCC, known as the LIMBURG, was seriously damaged in the attack and one crewmember was killed.

Following the attack, al-Queda issued a statement which warned that the attack on the Limburg, "was not an incidental strike at a passing tanker but . . . on the international oil-carrying line in the full sense of the word."

A significant portion of all world-wide sea-borne trade moves through a few critical maritime choke points where mines or other interference could have a serious negative impact on the world economy. These critical choke points offer terrorists an opportunity to have a large world economic impact by targeting a very small area.

The Strait of Malacca is a narrow sea passage between Sumatra and the Malay Peninsula that links the Indian and Pacific Oceans, which is only 1.5 miles wide at its narrowest point. It is the shortest sea route between three of the world's most populous countries, India, China, and Indonesia, and is considered to be the key choke point in Asia. More than 50,000 vessels transit the Strait each year. The VLCCs inch their way through the strait with barely a meter or two of clearance above the bottom.

The strait has been described as a perfect place for an ambush. In October 2002 terrorists bombed a nightclub on the Indonesian Island of Bali. The incident raised concerns that the Strait may also be a target. There are reports that Singapore and Malaysia have begun escorting the VLCCs and have increased naval patrols in the straight. However, this is only a small step toward eliminating the threat of terrorism in the region.

If the strait were closed, world-wide freight rates would immediately rise and all excess capacity of the world fleet would likely be absorbed.

The Bosporus strait, located in Turkey, is one of the world's busiest shipping channels. More than 50,000 vessels annually transit the 17-mile long waterway that divides Asia from Europe and connects the Black Sea with the Mediterranean Sea. The sea-borne traffic includes approximately 15 Oil Tankers/Day moving 2-million barrels/day of crude through the strait to Western and Southern European markets.

Only one-half mile wide at the narrowest point, the Turkish straits offer another terrorist opportunity to have a major impact on the world economy.

The Strait of Hormuz, which connects the Persian Gulf with the Gulf of Oman and the Arabian Sea, is by far the world's most important oil chokepoint. The tanker traffic through the Straight carries more than 13-million barrels/day of crude to the United States, Western Europe, and Japan. Inbound and outbound sea-borne traffic are confined to 2-mile wide channels separated by a 2-mile wide buffer zone.

Although the six-mile wide corridor provides a more challenging terrorist target, mining the channel with remotely controlled devices could be accomplished by a small force over a period of time. The days or weeks necessary to clear the mines and insure safe passage after such an event would result in a major shortage of energy and may precipitate a world-wide economic crisis.

The Gould Island Acoustic Communication and Tracking Range (GIATR) has been in operation for several years along Narragansett-Bay. GIATR provides a test facility for acoustic communications research and development with unmanned undersea vehicles (UUV). As well, a variety of sensors monitor environmental conditions in the Bay to provide data to build a historical database, which can be used for tracking changes that may be of interest. GIATR comprises nodes with acoustic transducers and acoustic arrays which are hardwired to shore power and provide Ethernet quality fiber-optic communications paths that link to the land. The equipment attached to a node can use up to 500 Watts of primary power and can link to topside equipment, or a surface network, over a high-speed fiber connection.

Acoustic communications (ACOMMS) coherent-modem development work of Naval Undersea Warfare Center (NUWC) professionals Dr. Josko Catipovic and Dr. Daniel Nagel is extensively reported in available literature.

While the ocean is a complex and difficult signal transmissions environment, coherent ACOMMS experiments using GIATR and other ranges have consistently demonstrated that a data rate-distance product of 100 kbit at a distance of one km is achievable using coherent ACOMMS modems developed at NUWC.

Another NUWC professional, Dr. Francis Chan, has developed a database management system that allows querying a database of more than 10,000 surface ships on the basis of observable attributes.

The above cited prior art does not provide a system that may be used for continuously and automatically monitoring and identifying thousands of surface and subsea water traffic. As an example only, the prior art does not provide a means for automatically producing a signature for each transport, including the subsurface features, for identification in any of the thousands of ports, littoral areas, coastal lines, and other waterways through which it may travel.

The solutions to the above-described problems are highly desirable but have never been obtained or available in the prior art. Consequently, those skilled in the art will appreciate the present invention that addresses the above and other problems.

SUMMARY OF THE INVENTION

An object of the present invention is to monitor ingress and egress to and from harbors and ports and perform surveillance and monitoring of waterways generally.

Another object of the present invention to render secure important harbors, waterways, and coastal approaches within the United States economic zone and/or worldwide.

Yet another object of the present invention is to provide a plurality of undersea networks that will support undersea data collection, data movement, and data fusion in ports, harbors, and littoral regions.

Yet another object of the present invention is to provide an automated system that produces an integrated intelligence picture of sea-borne traffic moving on the surface or underwater in a seaway.

Yet another object of the present invention is to integrate the common undersea picture derived from an undersea network of sensors and acoustic systems with a surface-ship database and to provide an automated ship-identification process to create an information system to support enhanced control and improved security for all affected seaway traffic.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

Accordingly, a waterway shield system may be provided which comprises, for example, one or more elements such as a first plurality of fixed underwater nodes mounted within a first waterway wherein the first plurality of fixed underwater nodes may comprise a sonar array and an acoustic communications transducer. The first plurality of fixed underwater nodes is preferably operable for producing sonar data for a hull of a first ship in the first waterway. Each of the first plurality of fixed underwater nodes preferably receives power from a generator mounted adjacent thereto. The invention may also comprise one or more processors operable for utilizing the sonar data for the hull of the first ship in the first waterway from the first plurality of fixed underwater nodes for identifying the first ship in the first waterway.

The system may further comprise an acoustic database which may comprise a predetermined compilation of historic acoustic attribute information for hulls for each of a plurality of ships. The one or more processors are operable for comparing the historic acoustic attribute information in the acoustic database with the acoustic attribute data for the hull of the first ship in the first waterway.

A second plurality of fixed underwater nodes may be mounted in a second waterway. Each of the second plurality of fixed underwater nodes may comprise a sonar array and an acoustic communications transducer. The second plurality of fixed underwater nodes is preferably operable for producing sonar data for a hull of a ship (or entity) in the second waterway. Each of the second plurality of fixed underwater nodes may receive power from a generator mounted adjacent thereto. The one or more processors are operable for utilizing the historical acoustic attribute data for the hull of the second ship in the second waterway from the second plurality of fixed underwater nodes for identifying the ship (or entity) in the first waterway.

The waterway shield system may further comprise one or more UUVs.

In one embodiment, one or more underwater energy replenishment stations may be utilized for the store energy sources on board the UUVs so that the UUVs may stay operational in the water indefinitely.

In one embodiment, the one or more underwater refueling stations are each powered by one or more underwater power generators.

In one embodiment, the one or more UUVs may be operable for deploying one or more of the first plurality of fixed underwater nodes at predetermined locations within the first waterway. The one or more UUVs may also be operable for installing one or more sensors on one or more of the first plurality of fixed underwater nodes mounted within the first waterway.

The waterway shield system may further comprise an optical database which may comprise a compilation of optical signature information for each of a plurality of ships, wherein the one or more processors are operable for comparing the optical signature information in the optical database with optical data related to the first ship in the first waterway for identifying the first ship.

A combiner processor function may be provided during processing for combining results from the comparing of sonar signature information in the acoustic database and from the comparing of the optical signature information in the optical database. The combiner compares the candidates from the sonar and optical processor functions to further limit the number of possible candidates for identification.

The invention provides a method for providing a waterway shield wherein the method may comprise one or more steps such as, for instance, deploying, or mounting, a plurality of underwater nodes in a first waterway wherein each underwater node comprises a sonar array and an acoustic communications transceiver, and/or scanning a first hull of a first ship in the first waterway utilizing the underwater nodes to produce first sonar data descriptive of the first hull of the first ship, and/or transmitting the first sonar data descriptive of the first hull of the first ship utilizing the acoustic communication transceivers of the first plurality of underwater nodes.

The method may further comprise one or more UUVs for transporting and deploying of the plurality of underwater nodes in the first waterway. The UUVs may preferably utilize underwater energy replenishment stations whereby the UUVs may remain substantially continuously in operation in a desired location. The underwater energy replenishment station may preferably be powered by utilizing an underwater power generator, such as a tidal current, or other underwater current impelled power generator. As well, the first plurality of underwater nodes may also be powered with a respective underwater generator mounted on or adjacent to each of the underwater nodes.

The method may further utilize the first sonar data descriptive of the first hull of the first ship for searching a sonar signature database which comprises sonar data descriptive of hulls for a plurality of ships. Moreover, the method may comprise detecting other physical attributes of the first ship and searching at least one physical attribute database which comprises physical attribute data descriptive of a plurality of ships. By comparing results after searching the sonar signature database and searching the physical attribute database, the method improves accuracy in identifying the first ship.

In one embodiment, the method comprises employing a plurality of UUVs around a perimeter of the waterway, and providing one or more underwater energy replenishment stations for the plurality of UUVs. Other steps may comprise mounting sensors on the one or more UUVs for detecting at least one of chemical, biological, radiation physical attributes related to the first ship or a wake of the first ship.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

The present invention may be utilized to support the safety and security of all seaborne trade terminals by guarding ingress at ports, harbors, and littoral areas throughout the world. The initiative produced thereby may be seen as essential to the continued growth of the world economy in the face of terrorism.

The present invention comprises a system of sensors, networks, databases, and algorithms, among other things, that work together to provide a picture of a waterway, which can be used to make informed decisions regarding entities using the waterway. In one embodiment, the present invention will automatically evaluate the state of information objects and present these evaluated information objects in a form that supports a decision process. The term "information object" is used to represent the result of a process that answers a question about a waterway picture. An information object is the result of fusing one or more data objects. The data objects result from sensor functions and collectively represent the history of the waterway picture in its most fundamental form.

The algorithms that create information objects from data objects are "object oriented" and managed by an "object broker" in a manner common to all objected-oriented programming. The continuous evaluation of the state of all information objects is the highest level of automation envisioned. The current state of a particular collection of information objects will support a particular action but any decision to execute a particular action will remain outside the scope of the present invention.

Figure 4:
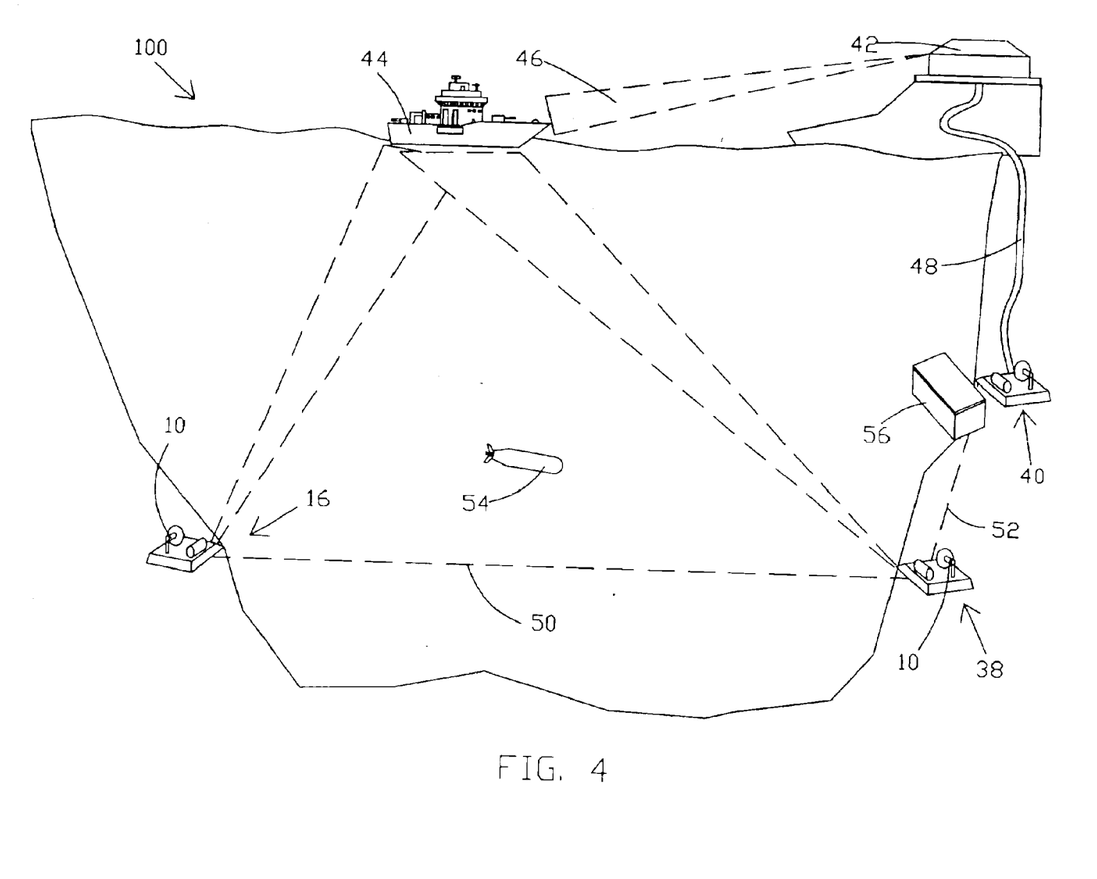
FIG. 4 is a diagrammatic view of an autonomous subsea network in accord with the present invention.

Referring to the drawings, and more specifically to FIG. 4, there is shown an embodiment of waterway shield system 100 for a particular waterway in accord with the present invention. One of the problems of implementing a waterway shield is that of providing power to the numerous elements of the waterway shield system which may be separated by miles. Ideally, the installation time is kept to a minimum by avoiding the need for running communication lines, power cables, and the like and using UUVs to deploy and maintain the underwater stations. Otherwise, the installation and maintenance costs of providing a system useable in hundreds or thousands of locations may be prohibitive. However, many commercial interests may arise from the existence of an underwater communication network (Undernet) deployed within large areas of the world's littoral regions. Already, aquaculture is a multi-billion dollar business. Undersea mining operations are also rapidly expanding. Diamond mining alone accounts for more than two billion dollars annually. Developing and deploying an Undernet as an extension of the worldwide Internet could support automated surveillance of our coastal regions as well as provide an infrastructure for commercial utilization of our coastal littoral areas.

Figure 1:
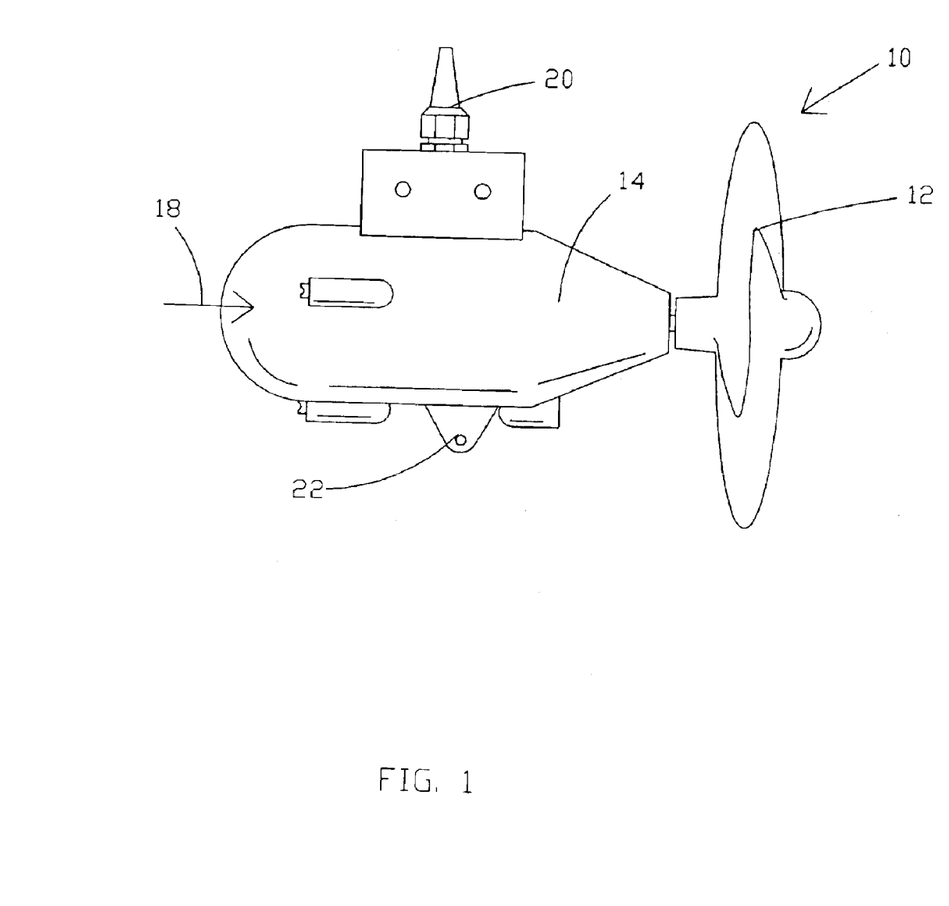
FIG. 1 is an elevational view of a subsea water current power generator to supply power to operate an autonomous subsea network in accord with the present invention.

Referring now to FIG. 1, there is shown a type of water current-powered submersible generator 10 that may be utilized for generation of power for remotely positioned elements of a waterway shield system in accord with the present invention. While this specific generator is shown, other types of generators may also be utilized, for example, chemical and biological fuel cells. Submersible generator 10 was previously utilized with towed seismic sleds. However, in accord with the present invention, submersible generator 10 is preferably fixed in position whereby propeller 12 is rotated in response to predictable tidal water currents. In some locations, tidal water currents provide a continuous water flow that may be utilized to power remote elements of the system as discussed hereinafter. Even in a relatively small package format of about a cubic foot, submersible generator 10 may produce several amperes of current at 12 volts DC with ordinary tidal current flow. Generator 10 is preferably provided in an oil-filled waterproof housing 14 which may be mounted to a sonar node package, and is shown mounted to sonar node package 16 shown in waterway shield system 100 of FIG. 4. Generator 10 may be rotatably mounted utilizing mount 20 or connector 22 such that housing 14 rotates so that water flow is in line with arrow 18 shown in FIG. 1. Rotatable connection of mount 20 or connector 22 to package 16 to maintain water flow in line of arrow 18 may be achieved by use of a Cardan joint. Mount 20 and/or connector 22 may be positioned on the housing, such as below or above the housing, at any desired position depending on the particular configuration desired.

While generator 10 is shown as a convenient means for power generation, other types of generators such as wave motion power generators, thermal gradient generators, sun-power generators, wind-power generators, and the like may also be utilized for operating the various components of system 100, depending on the characteristics of the waterway and environment. In this way, the various components of system 100 can be installed and operated quickly and efficiently without the need for laying and maintaining cables, supply power lines, and the like. If power is readily available to at least one node by a cable, as might be the situation close to an existing station on the edge of the waterway, then that node might also be utilized as a gateway to a surface network for the other nodes. However, other means for connecting nodes such as wireless transmission via water mounted antenna are also available.

Figure 3:
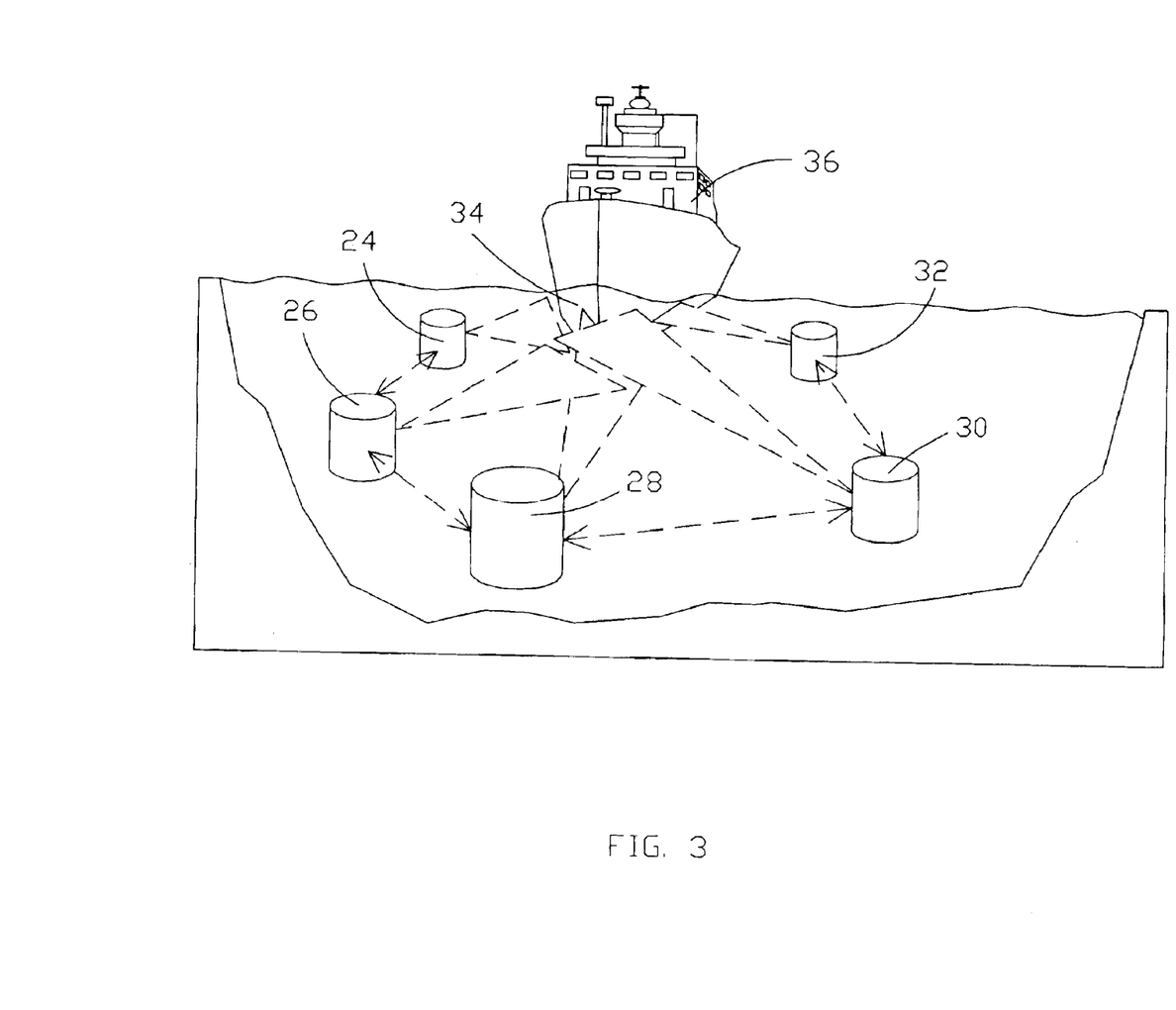
FIG. 3 is a diagrammatic view of subsurface hull sonar scanning for vessel identification in accord with the present invention.

FIG. 3 discloses the undersea hull scanning aspect of the present invention. In one preferred embodiment of the invention, autonomous undersea nodes capable of deriving power from local environmental sources can become the primary building blocks for an Undernet, or undersea Internet. For instance, nodes 24, 26, 28, 30, and 32 comprise sonar arrays and may be utilized to create a digital image of hull 34 for ship 36. In one preferred embodiment, a synthetic aperture sonar system, which may be formed utilizing nodes 24, 26, 28, 30, and 32, will create a digital image of the hull of a passing vessel that can be added to the known attributed of the specific ship in a master database, as discussed hereinafter. Each of the nodes can communicate the captured data along a desired data path, which may involve relays of the signal, to a gateway node. The nodes therefore create an'underwater network, with many possible signal paths, which may be utilized for communication purposes.

The synthetic-aperture process can be used to develop higher resolution images than would be obtained from individual signal returns. The individual signal returns from the array comprising nodes 24, 26, 28, 30, and 32 can be combined using synthetic-aperture processing algorithms in order to create a better image of an entity moving in the field of view of the array. The location of each array node is accurately known and a local time stamp is used to ensure that each acoustic-signal data object can be located in three-dimensional space and in time, which provides the four dimensions necessary to combine signals from the individual nodes. An accurate reconstruction of the sound image of a moving entity will also require an knowledge of the speed and direction of transit, which can also be derived from the array data using well known algorithms.

Nodes 24, 26, 28, 30, and 32 may preferably be deployed such that their positions are accurately known. The nodes comprise circuitry such as highly accurate clocks so the direction and distance of acoustic signals received can be measured with high resolution. Nodes 24, 26, 28, 30 and 32 may be utilized to measure, record and convert into the acoustic pressure wave information for any objects such as ships, submarines, or the like, into data comprised of time-dependent and location-dependent sound-wave attributes of the objects. The information collected for an object may be termed as data objects. For example, data objects may include acoustic data related to the hull of a ship, diver or UUV that moves through the waterway and within at least one of the fields of view of the acoustic arrays provided at each of nodes 24, 26, 28, 30 and 32. Each of said plurality of underwater nodes is equipped with a transceiver element of a communication system for receiving and transmitting data objects over an effective network that connects the nodes 24, 26, 28, 30, and 32 to a data processing center, such as facility 42 shown in FIG. 4 or processing center 102 shown in FIG. 5. At facility 42 or center 102 a plurality of time-dependent sound-wave-attribute data objects from said plurality of underwater nodes may be processed into acoustic pressure wave images using, for example, synthetic-aperture processing techniques or side-scan aperture processing techniques.

Figure 5:
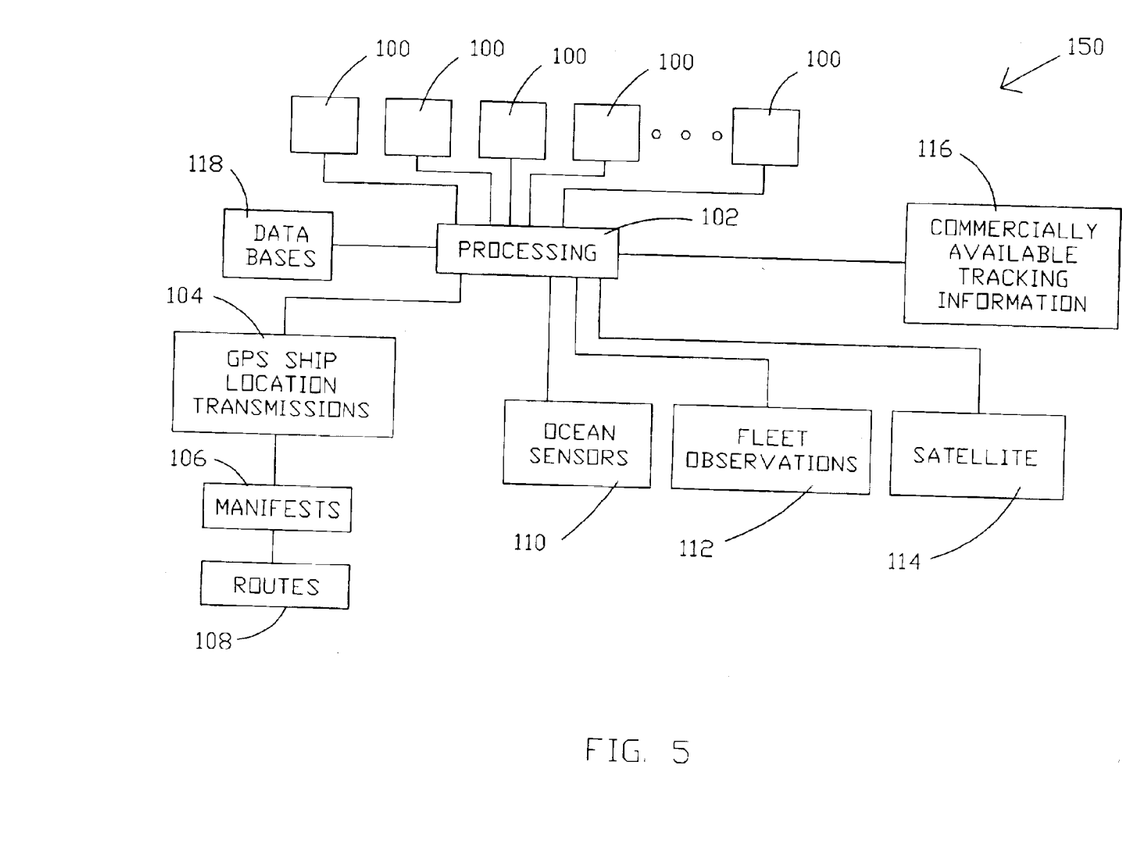
FIG. 5 is a block diagram schematic of a nationwide or worldwide system that combines information from a plurality of local waterway systems to provide a world-wide database and processing system.

The data processing center 42 or 102 have a capability for collecting attributes of sound-wave images of a particular physical object into a relational database that contains a variety of other attributes associated with the same physical object, which may have been obtained from at least one other source. The data processing center preferably has at a minimum a capability for identifying context-sensitive changes in one of more physical-object attributes.

Synthetic-aperture signal processing algorithms may be used to build images of the objects moving in predictable ways through the sonar-array field of view. The resulting feature vectors will enhance the known properties of ships in a master database, such as databases 118 in FIG. 5. A preferred embodiment of the present invention expands the existing surface-ship database to include ship-hull attributes that can be identified using automatic sonar imaging techniques. Other acoustic identification information may also be detected such as propeller noise, engine noise, water noise due to engagement with the ship's hull, and the like, which may be utilized in the database to further provide a signature of the ship-hull attributes.

Currently no automated system is capable of collecting ship-hull attributes with sufficient accuracy to build a database of ship-hull "fingerprints." Hull fingerprints could be used to identify new features of interest that may be a cause for alarm, such as objects attached to the exterior surface of a ship's hull. Preferably, prototype ship-hull scanning systems will be used to evaluate the potential of using readily available commercial-off-the-shelf (COTS) systems to discover ship-hull attributes of interest, which could significantly enhance the value of a ship-attributes database.

Automating the process of collecting acoustic ship-hull attributes will significantly expand our ability to identify changes that may portend a cause for concern. For example, ship-hull attributes collected at a departure point could be compared with attributes collected when the same entity arrives at another port in order to place in evidence any changes that have occurred in transit. Acoustic ship-hull attributes may also be used to covertly identify ships attempting to hide their identity by altering top-side appearance or flying a different flag. A ship interdicted in December, 2002 was flying a flag not of its country of origin and was found to have the flags of many nations in its hold. This ship most likely passed through the straight of Malacca and could have been surveyed in those confined waters.

The scanning system will also preferably be utilized to detect and identify fully submerged entities that pass through the sonar-array field of view such as divers, UUVs, and submarines.

In the embodiment of system 100 shown in FIG. 4, two side-scan sonar systems 16 and 38 will be used to simultaneously illuminate the main shipping corridor from fixed sites. Accordingly, sonar systems 16 and 38 may illuminate ships such as ship 44 but also may be utilized to illuminate UUVs, divers, and the like. While only one node is shown in FIG. 4 for 16 and 38, each of sonar systems 16 and 38 may actually comprise additional nodes which have an acoustic communication link therebetween. Gateway node 40, in this example, is hardwired through fiber-communications links 48 to surface network, or topside processing units, located in facility 42 adjacent to the waterway. All nodes are operable to communicate data via underwater transceivers to gateway node 40 either directly or in relay fashion whereby gateway node 40 is utilized to transmit the data to a surface network. However, gateway node 40 may also utilize other types of communications links such as floating antennas, antennas which may be raised and lowered, and the like, which could also be utilized for transmitting and receiving radio signals. Multiple or backup gateway nodes may also be utilized.

Digital image scanning techniques from camera stations, as indicated at 46 in FIG. 4, may be utilized to automatically obtain surface features of ship 44. Such image techniques may include use of images produced from all electromagnetic radiation spectrums including radar, infrared, and the like.

In FIG. 4, at least some and preferably all the remotely positioned undersea nodes, such as nodes 16 and 38, are preferably capable of autonomous operation and derive primary power from environmental energy sources. These autonomous nodes may be connected to a common network using coherent underwater acoustic communication data links as indicated at 50 and 52, which have already been developed and tested as capable of transmitting high resolution sonar image data within a reasonable time frame.

The autonomous nodes, such as nodes 16 and 38 may be deployed and maintained using dedicated UUV support. For instance UUV 54 or other UUVs may be utilized for initially deploying nodes 16 and 38. A UUV capable of automated deployment of payloads is disclosed in commonly assigned U.S. Pat. No. 5,675,116 to C. F. Hillenbrand, which is hereby incorporated by reference. (Particularly note the embodiments of FIGS. 9 and 10.) UUV 54 or other UUVs may also be utilized to provide increased information and monitoring by way of acoustic surveillance or sensors for chemical, biological, or radiological attributes related to a ship or its wake. Chemical, biological, radiological, and environmental sensors can be attached to and incorporated into the operation of, or removed from, the autonomous nodes 16 and 38 using UUV support. Techniques for docking and establishing operational communication between underwater equipments are disclosed in commonly assigned U.S. Pat. No. 5,349,916 to C. F. Hillenbrand, which is hereby incorporated herein by reference. Another illustrative technique for establishing operational communication between functional underwater equipments is disclosed in commonly assigned U.S. Pat. No. 5,291,194 to G. Ames, which is hereby incorporated herein by reference. Sensor software support at each node can be remotely configured over the network connection so that new sensors can be added to the undersea system when each becomes available.

In one preferred embodiment, the automated data-collection process at each node is also managed remotely so that essential data is pulled from the sensors when it is needed. However, each node preferably has a capability to enter an alarm state if locally sensed conditions exceed established alarm levels. When a node enters an alarm state, alerts are automatically dispatched through the communication links 48, 50, and 52.

UUVs, such as UUV 54, may also have sensors and/or sonar arrays mounted thereon. In this manner, sea-based UUVs may be utilized to maintain continuous perimeter surveillance and provide in-bound traffic alerts over an underwater communication network (Undernet) for entities of interest entering economic-zone borders. Sea-based UUVs may be stationed near a twelve-mile limit for indefinite periods of time while relaying sensor data over the Undernet and periodically re-powering at fueling stations where environmentally derived power is available. For instance, generators 10 may be mounted to provide a fueling station such as underwater fueling station 56 which may comprise battery storage that is charged up by one or more generators 10, or other types of power.

UUVs may be utilized for detecting chemical, biological, and radiological traces in a ship's wake and for making closer inspections of the hull or for detecting/retrieving things left by the ship. In a preferred embodiment, a suite of UUVs capable of supporting surveillance and enforcement decisions may be provided that can act in response to attribute observations. UUVs may be developed with the capability to inspect ship hulls for mines, detect divers in harbors, and also monitor unauthorized UUV traffic in areas of concern. It will be understood that UUVs and other submersibles are not only available to governments for national defense and homeland security purposes, but are also procurable on the world market by others with sufficient financial resources, such as terrorists, illegal drug purveyors, and the like. Thus, it is highly likely that unauthorized UUVs will be or perhaps already have been exploited by terrorists or others seeking to avoid the normal channels of entry into an economic zone.

While the principal driving force for sea-basing UUVs is the safety and security of our navy and of commercial seaborne trade, an operational Undernet may also establish an opportunity for new ocean-based commercial activity that could be supported with undersea communications. In many parts of the world, aquaculture, ocean mining, and fish farming are fast-growing economic segments. For example, a government-sponsored initiative in Australia seeks to increase aquaculture production to more than $2.5 billion by 2010 and create 23,000 new jobs. Extensive private commercial activity could significantly change the economics of deploying an Undernet throughout the littoral zones adjacent to the 95,000 miles of United States coastline.

Figure 2:
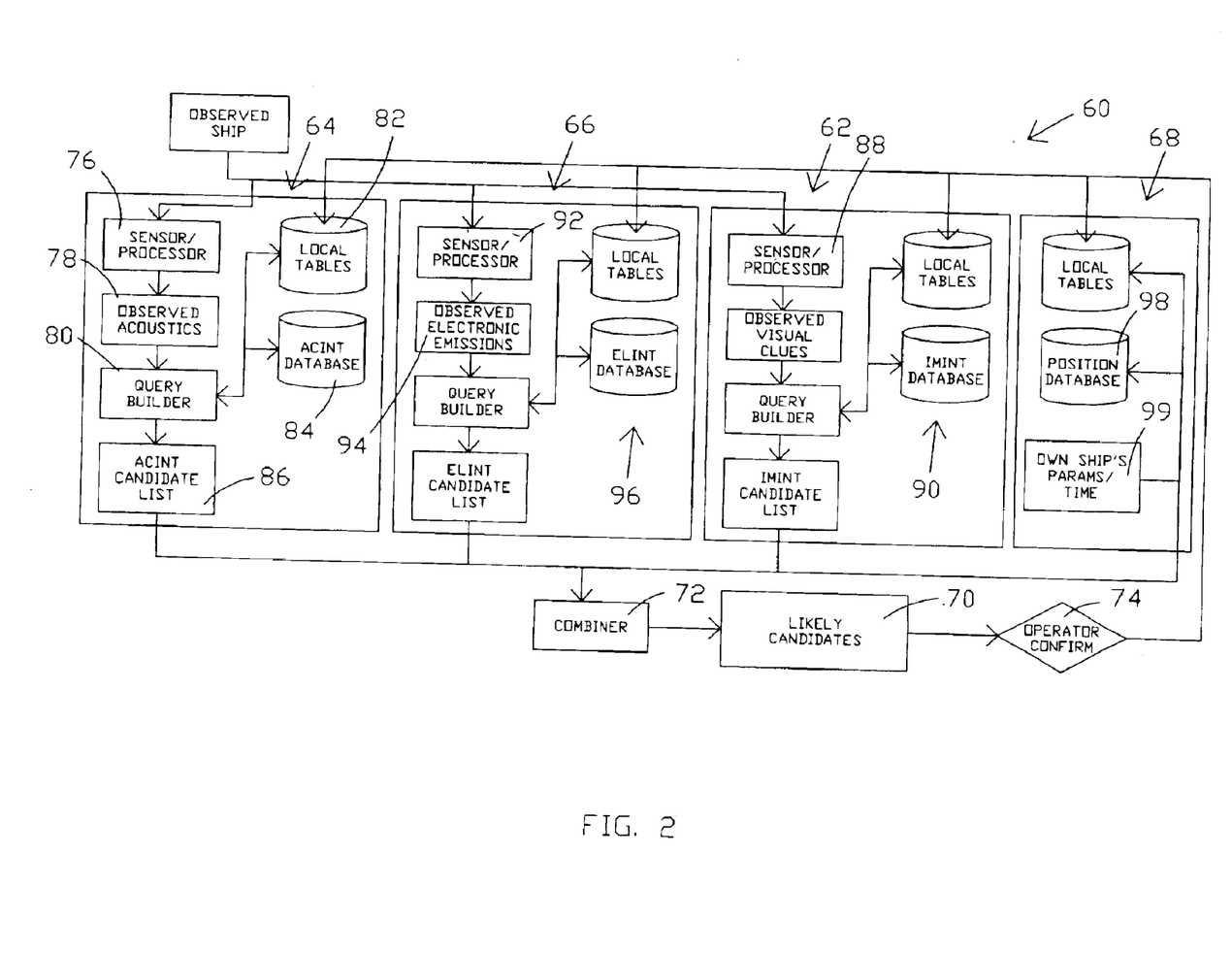
FIG. 2 is a schematic of ship identification data flow in accord with one embodiment of the invention.

Many of the observable attributes can be determined automatically in near real-time by digital image processing techniques, which leads to a preferred embodiment of automatic surface-ship identification module or system 60 as indicated in optical partition or block 62 of identification system 60 as shown in FIG. 2. Identification system 60 may be located locally with respect to an individual waterway as an integral component of system 100 and/or may be connected to overall system 150 as discussed hereinafter. Alternately, identification system 60 may be remotely located from the waterway as desired. Identification system 60 integrates intelligence feature vectors from multiple sources and may have a plurality of different intelligence processing blocks which are utilized simultaneously for identification purposes. For example, identification system 60 may comprise optical block 62, acoustic block 64, electronic 66 block, and position database block 68, to automatically partition the surface-ship database into a few probable matches or "hits" by combining the results as indicated at 72 so that if necessary an operator, as indicated at 74, can make a final identification from the so determined possibilities 70. It will be understood that identification system 60 may utilize additional processing blocks for utilizing other intelligence. Combiner 72 may be programmed for computing how to combine the possibilities as discussed hereinafter. After confirmation is made, the operator may choose to further update the attributes databases.

In one embodiment of the invention, each block of ship identification system 60 shown in FIG. 2 may operate with a substantially similar basic structure utilizing sensors to identify elements for look up in local databases and/or system wide 118 databases as may be developed by combining all databases as indicated in 150 of FIG. 5. For instance, sensors 76 as indicated in FIG. 2 may be comprised of various sonar arrays from UUVs and/or underwater nodes discussed hereinbefore that transmit high resolution sonar data to provide observed acoustic information 78. Based on acoustic information 78, queries may be developed as indicated at query builder 80 for local table of data 82 and system wide acoustic attribute or signature database 84 which may preferably be comprised of or linked with databases 118 from system 150. By matching observed acoustic data with the acoustic attribute database information, a list of candidates for the identification process is obtained as indicated at 86. The acoustic database may include features such as a sonar scan of the hull, propeller noise, engine type noise, etc. The 8 candidate list is compared, reduced, and/or combined at 72 along with candidate lists from blocks 62, 66, and 68 to compute the final list of likely candidates 70. Combiner 72 may provide a processor with algorithms that are used to add candidates when uncertain and delete candidates when analysis data is fairly certain to determine the best list of candidates. However, secondary lists, and so forth may also be provided for use by the operator as desired.

Sensor/processor 88 of optical block 62 may utilize digital imaging sensors, such as, for example only, CCD sensors in digital cameras, and algorithms for identifying attributes which are cataloged in local and world wide databases 90. As before, a query builder may be utilized to look up the attributes detected to produce a list of candidates.

Sensor/processor 92 of emissions block 66 may comprise passive radiation or active radiation detectors such as radar and the like. The observed attributes 94 may be compared with emission attributes or signatures stored in databases 96 to provide a list of potential identification candidates.

Other information such as ship position tables 98, own ship transmissions 99, ship speed, identification transceivers, and the like may also be utilized to produce a list of candidates for identification purposes and/or narrow the list or provide discrepancies. After review and confirmation by an operator as indicated at 74, if necessary, the updated information may be stored in local and system wide databases such as acoustic signature databases, radiation signature databases, visual databases, and ship position databases. Discrepancies between identifications may raise warnings that indicate further investigation is required.

The automated ship recognition system 60 of FIG. 2 uses observed features to partition the database into a few likely candidates. New features are preferably continuously added to the database as intelligence systems collect more information. Accordingly, system 100 of FIG. 4 with automatic under-hull scanning capability, as it is implemented in numerous waterways, would therefore expand a preferred embodiment surface-ship database features to include an enhanced set of underwater features.

Systems 60 and system 100 will integrate the common undersea picture derived from an undersea network of sensors and sonar systems with other databases to provide an automatic ship-identification process and thereby create an information system which will support enhanced control and improved security for all affected seaway traffic.

The surface-ship master databases( ) are preferably shared across the global information infrastructure so that attributes collected at one location may be used at other locations as a particular ship passes from one port to another as indicated in FIG. 5 with system 150 utilizing worldwide database 118. The search for critical information reduces to detecting attribute changes of an unusual nature. Thus, the more attributes that are known about a particular ship and stored in database 118, the more likely it is that a significant deviation will be recognized. Therefore, in accord with one embodiment of the present invention, hundreds or thousands of sensor networks 100 may be deployed in harbors and littoral regions. Networks 100, which will support a variety of sensors, will be capable of automatically scanning the under hull of ships entering and leaving a harbor. As shown in data processing system 150 of FIG. 5, data from hundreds or thousands of networks 100 may be processed at one or more processors 102 operable for searching and adding attributes to database 118, preferably largely under software control, to there define a future generation of undersea networks that will support undersea data collection, data movement, and data fusion in ports, harbors, and littoral regions throughout the world. Thus, the present invention can provide a foundation that will bring an added level of security to worldwide sea-borne trade and can help to insure the world economy, such as by helping to secure the important oil-route waterways linking the Middle-East oil fields to the world's major economic centers. Additional information regarding ship movement may be provided as indicate in FIG. 5. For instance, regulations may require regular ship location transmissions such as indicated at 104 which can be utilized to provide location information for each ship in the database. Manifests 106 and routes 108 may also be available. Ocean sensors 110 (e.g., autonomous sonar sensors with antenna transmitters), observation of normal or suspicious activity by naval ships or submarines 112, and satellite information 114 may also be utilized as cross-checks and/or to provide additional location and/or warning information.

The cost for the system may be carried at least partially by commercial interests that normally have a need to know where shipments of interest on any particular ship are presently located, where competitor ships may be located, estimated time of arrivals, and so forth, as indicated at 116 which may be a subscription website. Commercial interests could pay to obtain what might be quite valuable shipping/logistics information regarding ships available for cargo, cargo capacities., fuel levels, cargo status, destinations of cargos, present heading and routes, time of arrivals, types of cargos which may be carried, and the like which could be utilized to significantly reduce costs while increasing efficiency and speed of cargo delivery.

In summary of the present invention, a foundation is provided for deploying sensor networks in harbors and littoral regions. Autonomous undersea nodes, such as nodes 24–32, which are capable of deriving power from local environmental sources, such as generator 10, can become the primary building blocks for an Undernet, or undersea Internet. The autonomous undersea nodes are able to communicate between themselves with underwater transceivers. Acoustic communications systems may be comprised of underwater modems.

In each waterway system, such as system 100 of FIG. 4, sea-based UUVs, such as UUV 54, could maintain continuous perimeter surveillance and provide in-bound traffic alerts over the Undernet for entities of interest entering economic-zone borders.

The presence of an Undernet, or a plurality of systems 100 interconnected to each other through surface network connections, could provide a means of communications throughout littoral areas and may also result in expanded commercial economic activity such as aquaculture, mining, and fish farming. If this were to become a reality, then much of the cost of deploying an Undernet might be supported by commercial interests, thereby following a model similar to the evolution of the Internet.

For example, aquaculture is one of Australia's fastest growing primary industries. The Australian Federal Government recently announced an Aquaculture Industry Action Agenda with a goal of tripling production to $2.5 billion USD by 2010 and creating 29,000 new jobs.

The present invention comprises a comprehensive approach to providing safe passage on the high seas and safe harbors throughout the world that is capable of supporting continuous UV operations in harbors and littoral regions. The use of an interconnecting system as indicated at 150 in FIG. 5 would provide the ability to closely monitoring water traffic above and below the surface. Processors such as processor 60 may be utilized to automatically identify water traffic and sound alerts due to suspicious actions or vessels by identifying context-sensitive changes in one or more physical object attributes. As an example only, suspicious actions or vessels may include items attached to hulls, altered hull characteristics, unexpected hull draft, unidentifiable vessels, unauthorized UUVs, submarines, launched items, buoys, submerged items, divers, and the like which are out of the ordinary and/or contrast with expected data. While the principal driving force for sea-basing UUVs is the safety and security of our navy and of commercial sea-borne trade, an operational Undernet may also establish an opportunity for new ocean-based commercial activity that could be supported with undersea communications.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A waterway surveillance system comprising:
    a plurality of underwater nodes deployed at respective predetermined locations within a waterway, each of said plurality of underwater nodes comprising acoustic arrays operative to detect acoustic pressure wave signal attributes from an entity in said waterway, each of said plurality of underwater nodes comprising circuitry operable for producing digital data related to said acoustic pressure wave signal attributes of said entity, each of said plurality of underwater nodes being operative to transmit said digital data in the form of another signal through an underwater environment;
    at least one data processing center which as its input receives the underwater acoustic digital signals transmitted by the plurality of underwater nodes and processes them to provide acoustic attributes for said entity;
    a database operative to store predetermined acoustic attributes data objects for a variety of entities, said data comprising acoustic attribute data objects associated with respective acoustic attributes of said variety of entities; and
    an identification module operative to compare the acoustic attribute data objects, derived from acoustic pressure wave data from an entity in said waterway, with respective ones of the acoustic attribute identification data objects of said predetermined identification data objects for a variety of entities;
    said predetermined identification data objects being based upon a history of said data objects for said entities.

2. The system of claim 1, and:
    each of said nodes of said plurality of nodes being equipped with accurate clock circuitry providing a time reference and being operative to establish differential time of arrival of acoustic pressure wave signals at a plurality of said nodes.

3. The surveillance system of claim 1, further comprising:
    an optical signal subsystem operative to detect optical signal attribute data objects associated with said entity in said waterway, said predetermined identification data objects associated a variety of entities further including a compilation of optical signal signature data objects for respective ones of said plurality of entities, said identification module being operable for comparing said optical signal-attribute data objects for said entity in said waterway with respective ones of said optical signature data objects in said predetermined identification data objects; and
    said identification module comprising a combiner operative to combine results from said comparisons of said acoustic attribute identification with the respective ones of the acoustic attribution data objects of said predetermined identification data objects for the variety of entities and the results from said comparisons of the optical signal attribute data objects associated with said entity in said waterway with the respective optical signature information data objects to provide a list of candidate entities from said database for identification of said entity in said waterway.

4. The system of claim 1, wherein said identification module is further operative to identify physical differences in said entity in said waterway as compared to a history of stored predetermined identification data objects for the variety of entities in said database.

5. The system of claim 1, further operative to produce an alarm signal in responsive to predetermined criteria with respect to the results from the comparison of attribute information related to the entity in the waterway with the predetermined identification data objects stored in the database.

6. The system of claim 1, wherein said acoustic attribute identification information comprises acoustic pressure wave attributes for a hull of a ship.

7. The system of claim 1, wherein said acoustic attribute identification information comprises time-dependent and location-dependent acoustic pressure wave attributes.

8. The system of claim 1, further comprising:
    said predetermined identification data, which as aforesaid, are based upon history, being generated by at least one other plurality of underwater nodes deployed at predetermined locations within at least one other waterway, each of said at least one other plurality of underwater nodes comprising acoustic receiving arrays operative to detect acoustic pressure wave signal attribute of said entity, in the other waterway, each of said second plurality of underwater nodes comprising circuitry operable for producing digital data related to said acoustic pressure wave signal attributes of said entity, each of said at least one other plurality of underwater nodes being operative to transmit said digital data in the form of another signal through the underwater environment for use by said identification module as the predetermined identification data objects.

9. The system of claim 1, further comprising a self-contained power generator disposed underwater adjacent to said at least one of said plurality of underwater nodes of said plurality of nodes which is operative to generate power for said at least one of said plurality of underwater nodes.

10. The system of claim 1, further comprising:
    said predetermined identification data for a variety of entities including a second type of attribute data object of the entity other than said acoustic attribute data object; and
    at least one unmanned underwater vehicle (UUV) operable to effect a post deployment install to, and incorporate into the operation of, at least one underwater node sensor to detect said type of attribute of the entity and to produce digital data related to said second type of attribute data object and to transmit same through the underwater medium in a form of yet another signal.

11. A method for providing surveillance of a waterway, said method comprising:

deploying a plurality of underwater nodes at predetermined locations in a waterway wherein each underwater node comprises an acoustic array for detecting acoustic pressure waves related to an entity in said waterway, each of said plurality of underwater nodes being operative to transmit digital data related to said acoustic pressure waves through an underwater environment;

providing a gateway underwater node in communication with a surface network; and transmitting said digital data from said underwater nodes through said underwater environment to said gateway underwater node to be relayed to said surface network.

12. The method of claim 11, further comprising providing at least one unmanned underwater vehicle (UUV) to transport and deploy said plurality of underwater nodes in said waterway.

13. The method of claim 12, further comprising mounting sensors on said at least one UUV for detecting a physical attribute of said vessel of a group of attributes consisting of chemical, biological, or radiation physical attributes related to a vessel.

14. The method of claim 11, further comprising:

scanning a hull of a vessel in said waterway utilizing said underwater nodes to produce acoustic data descriptive of said hull; and transmitting said acoustic data descriptive of said hull to said surface network through said gateway underwater node.

15. The method of claim 14, further comprising:

utilizing said acoustic data descriptive of said hull for searching a predetermined database comprising acoustic data descriptive of hulls for a variety of vessels; and detecting at least one predetermined other physical attribute of said vessel and searching a predetermined database comprising said at least one predetermined other physical attribute descriptive for said variety of vessels.

16. The method of claim 15, further comprising comparing results from said searching of the predetermined acoustic attribute hulls database with said searching of the predetermined database of at least one other physical attribute for improving accuracy in identifying said vessel.

17. A method for providing surveillance of a waterway, said method comprising:

deploying a plurality of underwater nodes in a first waterway wherein each underwater node comprises an acoustic array, each of said plurality of underwater nodes being operable for transmitting digital data through an underwater environment;

detecting an acoustic physical attribute related to an entity in said waterway and producing digital data in the respective ones of said plurality of nodes related to said acoustic physical attribute;

providing a gateway underwater node in communication with a surface network;

transmitting the digital data related to the acoustic physical attribute from respective ones of said plurality of underwater nodes to said gateway node to be relayed to said surface network;

detecting and in the manner as aforesaid producing related data and in the manner as aforesaid transmitting to be relayed to said surface network at least one other physical attribute of said entity in said waterway;

providing a predetermined database in which said acoustic physical attribute of the entity and said at least one other physical attribute of the entity are stored, said predetermined data base being based upon a history of the attributes in a second different waterway; and searching said predetermined database for an acoustic physical attribute matching the acoustic physical attribute of the entity in the first waterway and an at least one other physical attribute of the entity matching the at least one other physical attribute of the entity in the second waterway.

18. The method of claim 17, and further utilizing the matching of at least two matches of the acoustic attribute and matches of the at least one other physical attribute between the entities in the first and second waterways to increase confidence that these entities are one in the same.

19. The method of claim 17, further comprising generating a warning in response to detection of a change in at least one physical attribute of said entity in said first waterway as compared to predetermined data stored in said database based upon history of the entity in the second waterway.

20. The method of claim 17, further comprising processing said digital data from said plurality of underwater nodes utilizing a processing technique of the group of processing techniques consisting of synthetic-aperture processing techniques and side-scan aperture processing techniques.

* * * * *